United States Patent
Kinoshita et al.

(10) Patent No.: US 9,305,146 B2
(45) Date of Patent: Apr. 5, 2016

(54) LICENSE MANAGEMENT DEVICE, LICENSE MANAGEMENT SYSTEM, LICENSE MANAGEMENT METHOD, AND PROGRAM

(75) Inventors: Shingo Kinoshita, Tokyo (JP); Koji Kawada, Tokyo (JP)

(73) Assignee: NEC Corporation, Tokyo (JP)

( * ) Notice: Subject to any disclaimer, the term of this patent is extended or adjusted under 35 U.S.C. 154(b) by 72 days.

(21) Appl. No.: 14/232,191

(22) PCT Filed: Jul. 11, 2012

(86) PCT No.: PCT/JP2012/067747
§ 371 (c)(1),
(2), (4) Date: Jan. 10, 2014

(87) PCT Pub. No.: WO2013/011902
PCT Pub. Date: Jan. 24, 2013

(65) Prior Publication Data
US 2014/0157429 A1 Jun. 5, 2014

(30) Foreign Application Priority Data
Jul. 19, 2011 (JP) ................................. 2011-157658

(51) Int. Cl.
*G06F 21/10* (2013.01)

(52) U.S. Cl.
CPC .................................... *G06F 21/105* (2013.01)

(58) Field of Classification Search
CPC .................................................... G06F 21/105
USPC .......................................................... 726/26
See application file for complete search history.

(56) References Cited

U.S. PATENT DOCUMENTS

| 2002/0124168 A1 | 9/2002 | Mccown et al. |
| 2004/0162846 A1 | 8/2004 | Nakahara et al. |
| 2004/0249762 A1 * | 12/2004 | Garibay et al. ................. 705/59 |
| 2005/0060388 A1 | 3/2005 | Tatsumi et al. |
| 2008/0104584 A1 | 5/2008 | Murata |
| 2008/0141378 A1 | 6/2008 | Mclean |
| 2009/0235363 A1 | 9/2009 | Tomita |
| 2009/0274304 A1 | 11/2009 | Kobayashi |

(Continued)

FOREIGN PATENT DOCUMENTS

| CN | 101174325 A | 5/2008 |
| CN | 101933024 A | 12/2010 |

(Continued)

OTHER PUBLICATIONS

International Search Report in PCT/JP2012/067747 dated Oct. 16, 2012 (English Translation Thereof).

(Continued)

*Primary Examiner* — Jacob Lipman
(74) *Attorney, Agent, or Firm* — McGinn IP Law Group, PLLC

(57) ABSTRACT

A license management device causes a wireless device to enter a state in which all functions are restricted by overwriting key information of the wireless device with a default key specific to the wireless device. A key generating device generates an upgrade key specific to the wireless device, and transmits the update key to the license management device. The license management device can release a restriction of a function in the wireless device by applying the upgrade key to the key information of the wireless device overwritten with the default key.

14 Claims, 7 Drawing Sheets

(56) References Cited

U.S. PATENT DOCUMENTS

| | | |
|---|---|---|
| 2011/0066721 A1 | 3/2011 | Shinomiya |
| 2011/0162079 A1 | 6/2011 | Amimoto |

FOREIGN PATENT DOCUMENTS

| | | |
|---|---|---|
| EP | 1 918 842 A2 | 5/2008 |
| JP | 2002-111894 A | 4/2002 |
| JP | 2003-506778 A | 2/2003 |
| JP | 2006-059163 A | 3/2006 |
| JP | 2006-059164 A | 3/2006 |
| JP | 2006-202017 A | 8/2006 |
| JP | 2006-217320 A | 8/2006 |
| JP | 2007-034389 A | 2/2007 |
| JP | 2007-058720 A | 3/2007 |
| JP | 2008-117078 A | 5/2008 |
| JP | 2010-218397 A | 9/2010 |
| KR | 2005-0098833 A | 10/2005 |
| WO | WO 03/096136 A2 | 11/2003 |
| WO | WO 2004/019182 A2 | 3/2004 |
| WO | WO 2009/073969 A1 | 6/2009 |
| WO | WO 2009/075181 A1 | 6/2009 |

OTHER PUBLICATIONS

United States Office Action dated Jun. 29, 2015 in co-pending U.S. Appl. No. 14/129,396.

European Search Report in Application No. 12804925.1 dated Mar. 9, 2015.

International Search Report in PCT/JP2012/066387 dated Jul. 31, 2012.

Extended European Search Report dated Jun. 24, 2015.

United States Office Action dated Nov. 4, 2015 in U.S. Appl. No. 14/129,396.

Korean Notice of Allowance dated Dec. 29, 2015, with a partial English translation.

* cited by examiner

FIG. 4A

| WIRELESS DEVICE | DEFAULT KEY |
|---|---|
| 10-1 | K1def |
| 10-2 | K2def |
| 10-3 | K3def |
| 10-4 | K4def |
| ⋮ | |

FIG. 4B

| FUNCTION | PERMISSION UPPER LIMIT NUMBER |
|---|---|
| Capacity | 3 |
| Redundancy | 4 |
| XPIC | 1 |

LICENSE MANAGEMENT DEVICE, LICENSE MANAGEMENT SYSTEM, LICENSE MANAGEMENT METHOD, AND PROGRAM

TECHNICAL FIELD

The present invention relates to a license management device, a license management system, a license management method, and a program used to manage permission of execution of a predetermined function in a licensee device that performs a function according to key information specifying an operation.

BACKGROUND OF THE INVENTION

There is a type of sale in which a wireless device having a restricted function is sold and the function of the wireless device is unlocked according to a contract with a licensee. Specifically, key information representing that a predetermined function is restricted is stored in a wireless device performing a function according to key information specifying an operation as an initial state, and the function of the wireless device is unlocked by rewriting the key information according to a contract.

A method of updating key information in a wireless device is disclosed in Patent Document 1. According to the method described in Patent Document 1, when a licensee designates a wireless device and requests a support center or the like to unlock a function thereof, the support center generates an upgrade key that is data used to update key information of the designated wireless device and transmits the upgrade key to a terminal of the licensee. The licensee applies the upgrade key received by the terminal to the designated wireless device to update key information. Further, the upgrade key is data that is encrypted by an encryption key specific to the designated wireless device, and is itself specific to the designated wireless device, and thus it is difficult to apply the upgrade key to any other wireless device. This prevents a function from being unlocked in a wireless device that is not under contract using a copy of the upgrade key.

DOCUMENTS OF THE PRIOR ART

Patent Document

[Patent Document 1]
 Japanese Unexamined Patent Application, First Publication No. 2008-117078

DISCLOSURE OF INVENTION

Problems to be Solved by the Invention

Meanwhile, for example, when a wireless device is added or transferred, there is a desire to change a wireless device in which a function is to be unlocked according to the addition or the transfer. For example, when a function of a wireless device A has been unlocked, but as a wireless device B is added, there is a desire to undo the function of the wireless device A and unlock the function of the wireless device B.

However, since the upgrade key is specific to one wireless device as described above, there is a problem in that it is difficult to apply the upgrade key to other wireless devices.

The present invention has been made in light of the foregoing, and an object of the present invention is to provide a license management device, a license management system, a license management method, and a program, which are capable of changing a wireless device in which a function is to be unlocked.

Means for Solving the Problem

A license management device according to an embodiment of the present invention is configured to solve the above problems, and manages permission of execution of a predetermined function in a licensee device configured to perform a function according to key information specifying an operation. The license management device includes a request receiving unit configured to receive a license change request used to request the licensee device to unlock or restrict a function, a default applying unit configured to overwrite a default key restricting a function of the licensee device that is key information specific to the licensee device represented by the license change request on key information of the licensee device when the request receiving unit receives the license change request, an upgrade key requesting unit configured to transmit an upgrade key generation request including identification information of the licensee device and a function to be unlocked that are represented by the license change request received by the request receiving unit to a key generating device configured to generate an upgrade key that is difference data between the key information unlocking the function restricted by the default key of the licensee device and the default key based on the identification information of the licensee device and a function applied to the licensee device, an upgrade key acquiring unit configured to acquire the upgrade key generated based on the upgrade key generation request transmitted by the upgrade key requesting unit from the key generating device, and an upgrade applying unit configured to apply the upgrade key acquired by the upgrade key acquiring unit to the key information of the licensee device after the default applying unit overwrites the key information.

Further, a license management system according to an embodiment of the present invention includes a plurality of licensee devices performing a function according to key information specifying an operation, a license management device configured to manage a grant of a license for a predetermined function to the licensee device, and a key generating device configured to generate difference data of the key information in the licensee device. In the license management system, the licensee device includes a key information storage unit configured to store the key information and a function performing unit configured to perform the function according to a restriction represented by the key information stored in the key information storage unit, the license management device includes a request receiving unit configured to receive a license change request used to request the licensee device to unlock or restrict a function, a default applying unit configured to overwrite a default key restricting a function of the licensee device that is key information specific to the licensee device represented by the request on key information of the licensee device when the request receiving unit receives the license change request, request including identification information of the licensee device and a function to be unlocked that are represented by the license change request received by the request receiving unit to the key generating device, an upgrade key acquiring unit configured to acquire the upgrade key generated based on the upgrade key generation request transmitted by the upgrade key requesting unit from the key generating device, and an upgrade applying unit configured to apply the upgrade key acquired by the upgrade key acquiring unit to the key information of the licensee device after the default applying unit overwrites the key information, and the key generating device includes an upgrade key generating unit configured to receive the upgrade key generation request from the license management device, and generates an upgrade key that is difference data between the key information in the licensee device and the default key based on the identification information of the licensee device and a function applied to the licensee device that are represented by the upgrade key generation request and a key transmitting unit configured to transmit the upgrade key generated by the upgrade key generating unit to the license management device.

Further, a license management method according to an embodiment of the present invention includes a license management device configured to manage a grant of a license for a predetermined function to a licensee device configured to perform a function according to key information specifying an operation. The license management method includes receiving, by a request receiving unit, a license change request used to request the licensee device to unlock or restrict a function, overwriting, by a default applying unit, a default key restricting a function of the licensee device that is key information specific to the licensee device represented by the request on key information of the licensee device when the request receiving unit receives the license change request, transmitting, by an upgrade key requesting unit, an upgrade key generation request including identification information of the licensee device and a function to be unlocked that are represented by the license change request received by the request receiving unit to a key generating device configured to generate an upgrade key that is difference data between the key information unlocking the function restricted by the default key of the licensee device and the default key based on the identification information of the licensee device and a function applied to the licensee device, acquiring, by an upgrade key acquiring unit, the upgrade key generated based on the upgrade key generation request transmitted by the upgrade key requesting unit from the key generating device, and applying, using an upgrade applying unit, the upgrade key acquired by the upgrade key acquiring unit to the key information of the licensee device after the default applying unit overwrites the key information.

Further, a program according to an embodiment of the present invention causes a license management device configured to manage a grant of a license for a predetermined function to a licensee device configured to perform a function according to key information specifying an operation to function as a request receiving unit configured to receive a license change request used to request the licensee device to unlock or restrict a function, a default applying unit configured to overwrite a default key restricting a function of the licensee device that is key information specific to the licensee device represented by the request on key information of the licensee device when the request receiving unit receives the license change request, an upgrade key requesting unit configured to transmit an upgrade key generation request including identification information of the licensee device and a function to be unlocked that are represented by the license change request received by the request receiving unit to a key generating device configured to generate an upgrade key that is difference data between the key information unlocking the function restricted by the default key of the licensee device and the default key based on the identification information of the licensee device and a function applied to the licensee device, an upgrade key acquiring unit configured to acquire the upgrade key generated based on the upgrade key generation request transmitted by the upgrade key requesting unit from the key generating device, and an upgrade applying unit configured to apply the upgrade key acquired by the upgrade key acquiring unit to the key information of the licensee device after the default applying unit overwrites the key information.

Effects of the Invention

According to a license management device of the present invention, it is possible to restore restriction of a function in a licensee device to an original state by overwriting key information with a default key specific to the licensee device, and it is possible to unlock restriction of a function in the licensee device by applying an upgrade key to the key information overwritten with the default key. Thus, a licensee can change a wireless device in which a function is unlocked.

BRIEF DESCRIPTION OF DRAWINGS

FIG. 4A is a diagram illustrating information stored in a license management device.

FIG. 4B is a diagram illustrating information stored in a license management device.

EMBODIMENTS FOR CARRYING OUT THE INVENTION

Hereinafter, an embodiment of the present invention is described with reference to the appended drawings.

Figure 1:
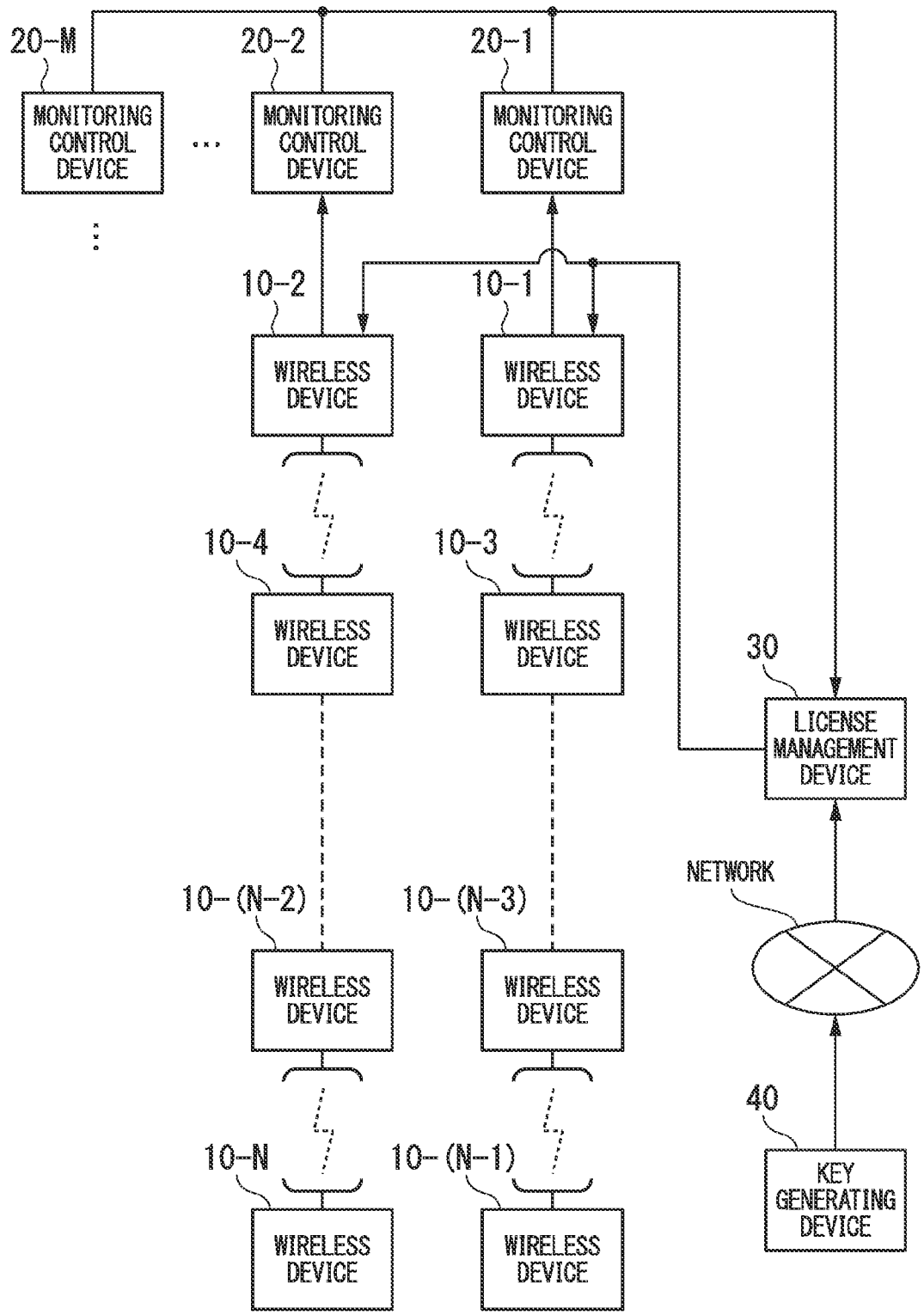
FIG. 1 is a schematic block diagram of a license management system according to an embodiment of the present invention.

FIG. 1 is a schematic block diagram of a license management system according to an embodiment of the present invention.

A license management system includes a plurality of wireless devices 10-1 to 10-N (licensee devices) (hereinafter, the wireless devices 10-1 to 10-N are collectively referred to as a "wireless device 10"), a plurality of monitoring control devices 20-1 to 20-M (licensee monitoring devices) (hereinafter, the monitoring control devices 20-1 to 20-M (here, N>M) are collectively referred to as a "monitoring control device 20"), a license management device 30, and a key generating device 40. The wireless device 10, the monitoring control device 20, and the license management device 30 are possessed by a licensee (a user, an operator, a purchaser, or the like) of the wireless device 10, and the key generating device 40 is possessed by a licenser (an administrator, a vendor, a seller, or the like) of the wireless device 10. The license management device 30 is connected with the key generating device 40 via a network. Examples of the network via which the license management device 30 is connected with the key generating device 40 include the Internet and a wide area network (WAN) connecting a local area network (LAN) of the licensee with the LAN of the licenser.

The wireless device 10 performs wireless communication with a counterpart wireless device 10 based on microwaves.

For example, the wireless device 10-1 performs wireless communication with the wireless device 10-3. At this time, the wireless device 10 performs wireless communication according to key information stored therein. Examples of a function designated according to the key information include communication capacity, the presence or absence of a redundancy structure, and the presence or absence of application of cross polarization interference cancellation (XPIC). For example, when the key information stored in the wireless device 10-1 represents a setting in which the communication capacity is 10 Mbps, there is no redundancy structure, and the XPIC is not applied, wireless communication with the wireless device 10-3 is performed according to this key information. The key information is rewritten by the license management device 30.

The license management device 30 transmits the key information to the wireless device 10 that is the rewrite target of the key information through the wireless devices 10 that are connected in series by a communication path. For example, when the wireless device 10 (the wireless device 10 of the subsequent stage) connected to the license management device 30 via another wireless device 10 (the wireless device 10 of the preceding stage) is the rewrite target of the key information, the license management device outputs the key information in which the wireless device 10 of the subsequent stage is set as the destination to the wireless device 10 of the preceding stage. Then, the wireless device 10 of the preceding stage transfers the acquired key information to the wireless device 10 of the subsequent stage represented by the destination through wireless communication. In other words, the wireless device 10 of the preceding stage operates as a router, and thus the key information is transferred to the wireless device 10 of the subsequent stage.

Figure 2:
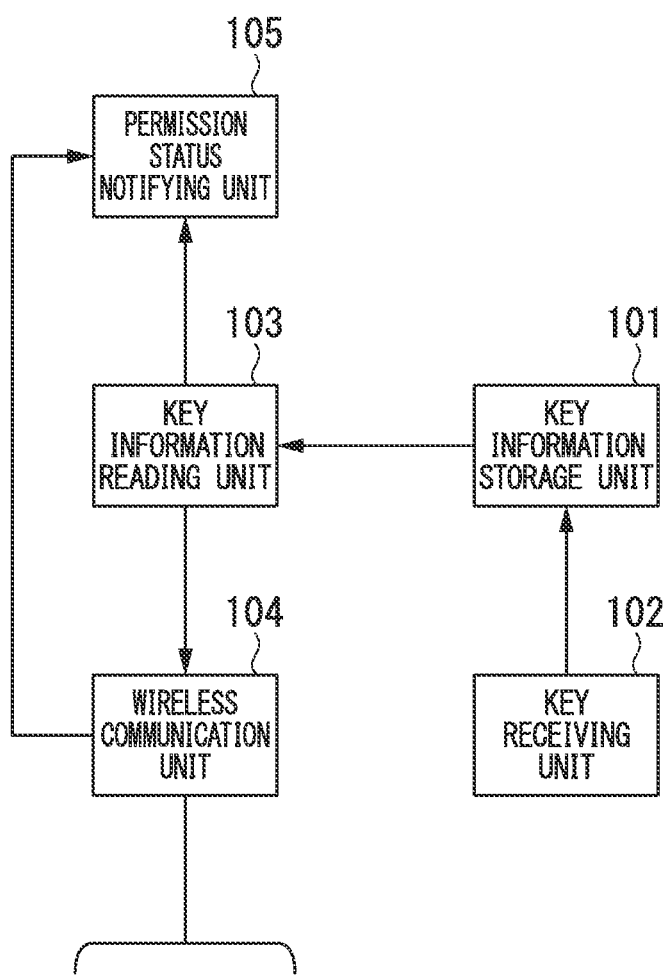
FIG. 2 is a schematic block diagram illustrating a structure of a wireless device.

FIG. 2 is a schematic block diagram illustrating the structure of the wireless device 10.

The wireless device 10 includes a key information storage unit 101, a key receiving unit 102, a key information reading unit 103, a wireless communication unit 104 (a function performing unit), and a permission status notifying unit 105.

The key information storage unit 101 stores the key information specifying wireless communication function that is performed by the wireless communication unit 104. The key information stored in the key information storage unit 101 is encrypted by an encryption key specific to the wireless device 10.

The key receiving unit 102 receives a default key from the license management device 30, and overwrites the key information stored in the key information storage unit with the default key. Further, the key receiving unit 102 receives an upgrade key that is difference information of the default key from the license management device 30, and applies the upgrade key to the key information stored in the key information storage unit.

Through this operation, it is possible to restore the key information stored in the key information storage unit to a factory initial state of the wireless device 10. Further, the key receiving unit 102 receives an upgrade key that is difference information of the default key from the license management device 30, and applies the upgrade key to the key information stored in the key information storage unit. Further, the key receiving unit 102 receives the key information through the wireless communication unit 104 when the key information (the default key or the upgrade key) is received from another wireless device 10 through wireless communication, and receives the key information through a connection port when the key information is received from the license management device 30 or another wireless device 10 in a wired manner.

The key information reading unit 103 decodes the key information stored in the key information storage unit using the encryption key specific to the wireless device 10, and reads a restriction of a function represented by the key information.

The wireless communication unit 104 performs a wireless communication function according to the restriction represented by the key information read by the key information reading unit 103.

The permission status notifying unit 105 notifies the monitoring control device 20 of permission status information represented by a function enabled in the wireless device 10 and permission status information acquired from the counterpart wireless device 10 through the wireless communication unit 104 based on the restriction of the function read by the key information reading unit.

The monitoring control device 20 performs communication with the plurality of wireless devices 10 connected via the communication path, acquires the permission status information of each wireless device 10 at regular intervals, and notifies the license management device 30 of the acquired permission status information.

The license management device 30 stores the default key that is the key information of the initial value specific to the wireless device 10, and determines whether the upgrade key unlocking a predetermined function is applied to the wireless device 10 according to a permission upper limit number of function unlocking decided according to a contract between the licensee and the licenser. Here, the upgrade key represents difference data between the key information used to unlock a predetermined function and the default key. Thus, the upgrade key is data that differs according to each wireless device 10 even when used to unlock the same function. Here, as an optional function that can be unlocked in the present embodiment, there are three types of functions including a function (capacity) of increasing the communication capacity, a function (redundancy) of applying the redundancy structure, and a function (XPIC) of applying the XPIC. However, any other optional function may be used. For example, when the capacity function is applied, the communication capacity is increased from 10 Mbps to 100 Mbps. In other words, as the upgrade key applicable to a certain wireless device 10, there are 7 types including a capacity application, a redundancy application, an XPIC application, a capacity/redundancy application, a capacity/XPIC application, a redundancy/XPIC application, and a capacity/redundancy/XPIC application. The upgrade key in which the functions are combined in addition to the upgrade key of each function is used because the upgrade key is difference data that can be applied only to the default key. The upgrade key is encrypted by the encryption key specific to the corresponding wireless device 10. Thus, even when the upgrade key issued to a certain wireless device 10 is illegally copied and applied to the key information of another wireless device 10, since it is difficult to decode the upgrade key using the encryption key of the other wireless device 10, it is possible to prevent illegal use of the upgrade key.

Figure 3:
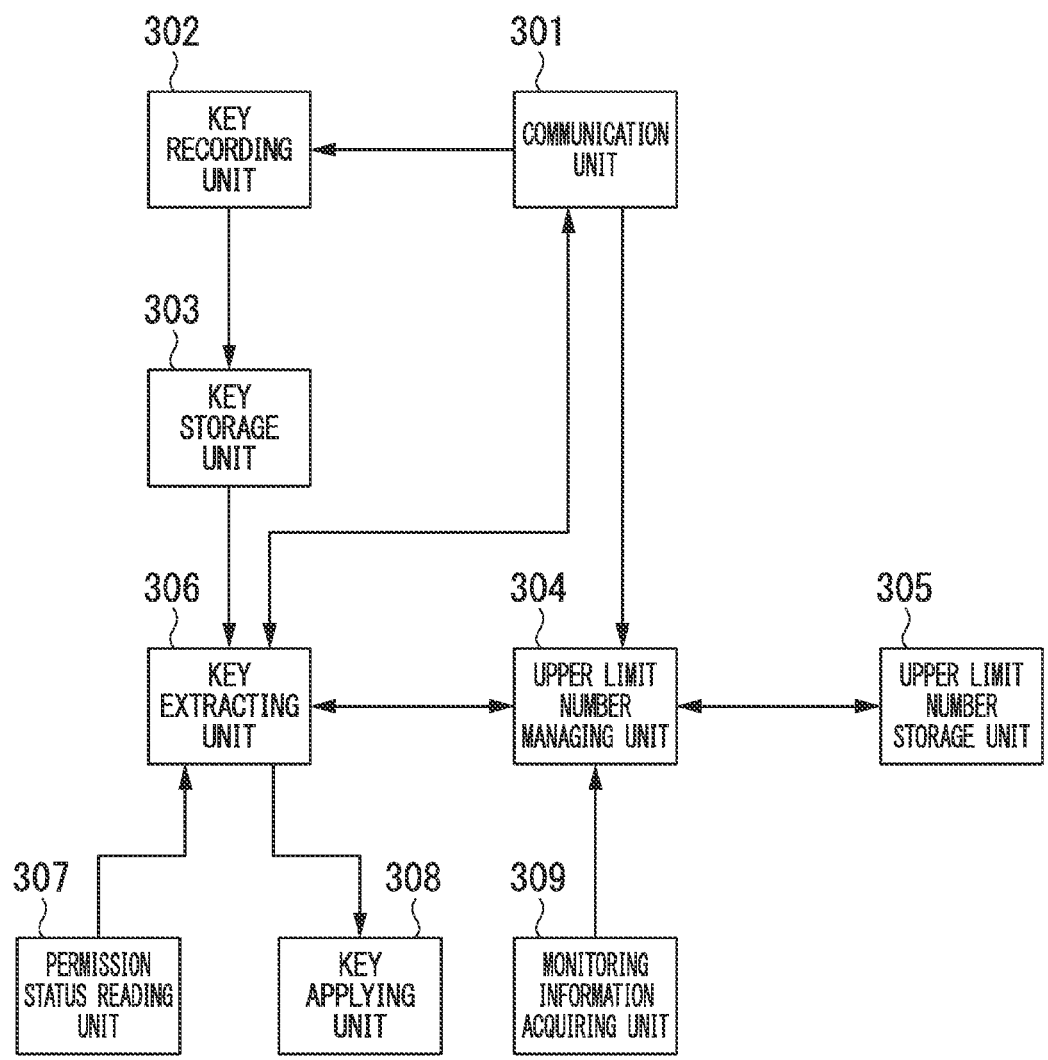
FIG. 3 is a schematic block diagram illustrating a structure of a license management device.

FIG. 3 is a schematic block diagram illustrating the structure of the license management device 30.

The license management device 30 includes a communication unit 301 (an upgrade key requesting unit and an upgrade key acquiring unit), a key recording unit 302, a key storage unit 303, an upper limit number managing unit 304 (an upper limit number updating unit and a reflecting unit), an upper limit number storage unit 305, a key extracting unit 306 (a request receiving unit), a permission status reading unit 307, a key applying unit 308 (a default applying unit and an upgrade applying unit), and a monitoring information acquiring unit 309.

The communication unit 301 receives the default key and an increase/decrease value of the permission upper limit number from the key generating device 40 connected via a network. The communication unit 301 transmits an upgrade key generation request of the wireless device 10 to the key generating device 40, and receives a corresponding update key from the key generating device 40.

The key recording unit 302 stores the default key received by the communication unit 301 in the key storage unit 303.

The key storage unit 303 stores the default key in association with the identification information of the wireless device 10.

The upper limit number managing unit 304 updates the permission upper limit number stored in the upper limit number storage unit 305 based on the increase/decrease value of the permission upper limit number received by the communication unit 301. Further, the upper limit number managing unit 304 increases or decreases the permission upper limit number stored in the upper limit number storage unit 305 when the key extracting unit 306 reads the default key from the key storage unit 303 and the communication unit 301 receives the upgrade key. Further, the upper limit number managing unit 304 updates the permission upper limit number stored in the upper limit number storage unit 305 based on information acquired by the monitoring information acquiring unit 309.

The upper limit number storage unit 305 stores the permission upper limit number representing a number of times execution of each function unlocked in the wireless device 10 can be allowed.

The key extracting unit 306 receives a license change request used to request function unlocking or function restriction from the wireless device 10 of the licensee. The license change request includes the identification information of the wireless device 10 on which a function is to be unlocked or restricted and a corresponding function when the function is unlocked. The key extracting unit 306 extracts the default key associated with the identification information included in the license change request from the key storage unit 303. Further, the key extracting unit 306 acquires the upgrade key received by the communication unit 301.

The permission status reading unit 307 reads the permission status information that is information of a function permitted in the wireless device 10 from the wireless device 10. Specifically, the permission status information is information representing an unlocked function among functions restricted by the default key.

The key applying unit 308 records the default key extracted by the key extracting unit 306 in the wireless device 10 of the target as the key information, and applies the upgrade key extracted by the key extracting unit 306 to the key information of the wireless device 10 of the target.

The monitoring information acquiring unit 309 acquires information representing a function enabled in each wireless device 10 monitored by the monitoring control device 20 from the monitoring control device 20.

FIGS. 4A to 4B are diagrams illustrating information stored in the license management device 30. The key storage unit 303 stores the default key specific to the wireless device 10 in association with the identification information of the wireless device 10 as illustrated in FIG. 4A. In the present embodiment, as an example, when the wireless device 10 is in the initial state, it is assumed that the communication capacity is restricted to, for example, 10 Mbps, and there is no permitted optional function. In other words, in the present embodiment, when the wireless device 10 uses the default key as the key information, the wireless device 10 is assumed to have the communication capacity of 10 Mbps and perform communication at a setting in which the optional function such as the redundancy structure or the XPIC is not applied. The default key is encrypted by the encryption key specific to the corresponding wireless device 10. Further, information stored in the key storage unit 303 is encrypted by the encryption key specific to the license management device 30. Thus, it is possible to prevent the default key from being illegally used even when information stored in the key storage unit 303 is extracted by illegal access.

The upper limit number storage unit 305 stores the permission upper limit number of the function in association with the function as illustrated in FIG. 4B. The upper limit number storage unit 305 stores the permission upper limit number in association with a single function rather than a function and a function combination. Thus, when the upgrade key received by the communication unit 301 represents the capacity/XPIC application, the upper limit number managing unit 304 reduces the permission upper limit number that is stored in associated with the capacity in the upper limit number storage unit 305 and the permission upper limit number that is stored in associated with the XPIC in the upper limit number storage unit 305 one at a time.

The key generating device 40 receives the identification information of the wireless device 10 sold by the licenser, and generates the default key and the upgrade key to be applied to the wireless device 10. Further, the key generating device 40 decides whether the permission upper limit number by which execution of a predetermined function can be allowed in the wireless device 10 possessed by the licensee is to be increased or decreased based on a license contract between the licenser and the licensee. The permission upper limit number is calculated for each function. For example, the permission upper limit number is set to differ according to each function, for example, the number of the wireless devices 10 to which the XPIC is allowed to be applied is set to be five (5), and the number of the wireless devices 10 to which the redundancy structure is allowed to be applied is set to be two (2).

Figure 5:
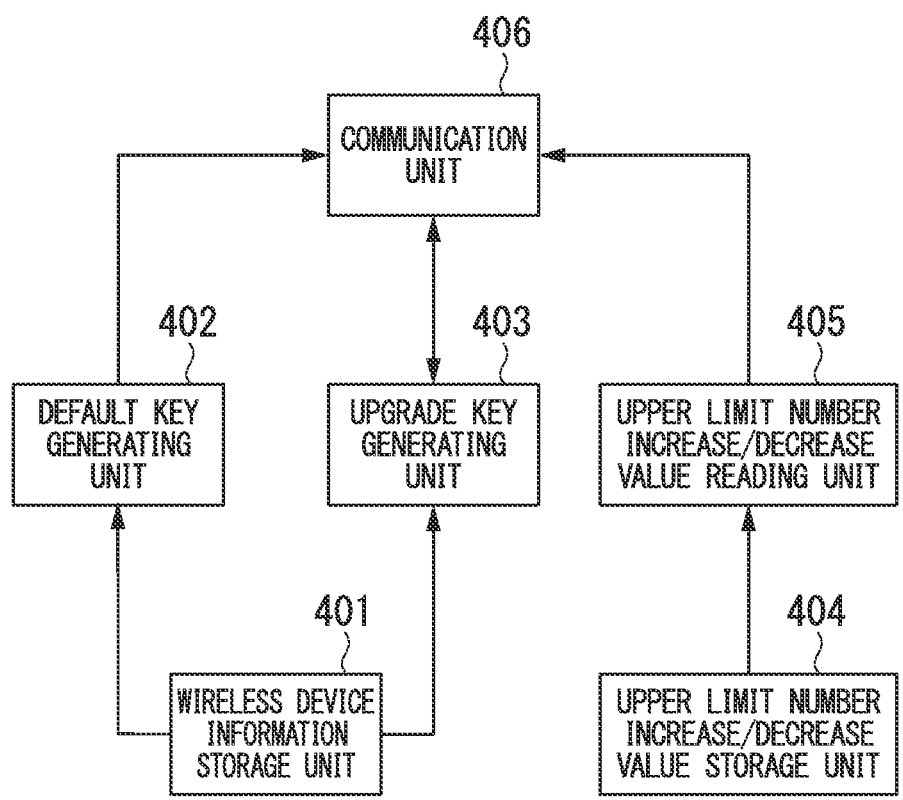
FIG. 5 is a schematic block diagram illustrating a structure of a key generating device.

FIG. 5 is a schematic block diagram illustrating the structure of the key generating device 40.

The key generating device 40 includes a wireless device information storage unit 401, a default key generating unit 402, an upgrade key generating unit 403, an upper limit number increase/decrease value storage unit 404, an upper limit number increase/decrease value reading unit 405, and a communication unit 406.

The wireless device information storage unit 401 stores the identification information of the wireless device 10 sold by the licenser and the encryption key specific to the wireless device 10.

The default key generating unit 402 generates the default key specific to the wireless device 10 by encrypting the default key using the encryption key that is stored in the wireless device information storage unit 401 in association with the identification information of the wireless device 10 received by the communication unit 406.

The upgrade key generating unit 403 generates the upgrade key specific to the wireless device 10 based on the identification information of the wireless device 10 and a function to be applied, which are represented by the upgrade key generation request received by the communication unit 406. Specifically, the upgrade key generating unit 403 generates the upgrade key by generating a difference between an information key used to unlock the function represented by the upgrade key generation request and the default key and encrypting the difference using the encryption key that is stored in the wireless device information storage unit 401 in association with the identification information of the wireless device 10 represented by the upgrade key generation request.

The upper limit number increase/decrease value storage unit 404 stores the increase/decrease value of the permission upper limit number by which execution of a predetermined function can be permitted in the wireless device 10 possessed by the licensee. The increase/decrease value of the permission upper limit number is set by the licenser for each contract between the licensee and the licenser.

The upper limit number increase/decrease value reading unit 405 reads the increase/decrease value of the permission upper limit number stored in the upper limit number increase/decrease value storage unit 404, and outputs the increase/decrease value of the permission upper limit number to the communication unit 406. At this time, the upper limit number increase/decrease value reading unit 405 rewrites the increase/decrease value of the permission upper limit number stored in the upper limit number increase/decrease value storage unit to zero (0).

The communication unit 406 transmits the default key and the increase/decrease value of the permission upper limit number to the license management device 30 via the network. Further, the communication unit 406 receives the upgrade key generation request from the license management device 30 via the network, and transmits the upgrade key generated according to the upgrade key generation request to the license management device 30.

Next, an operation of the license management system according to the present embodiment will be described.

Figure 6:
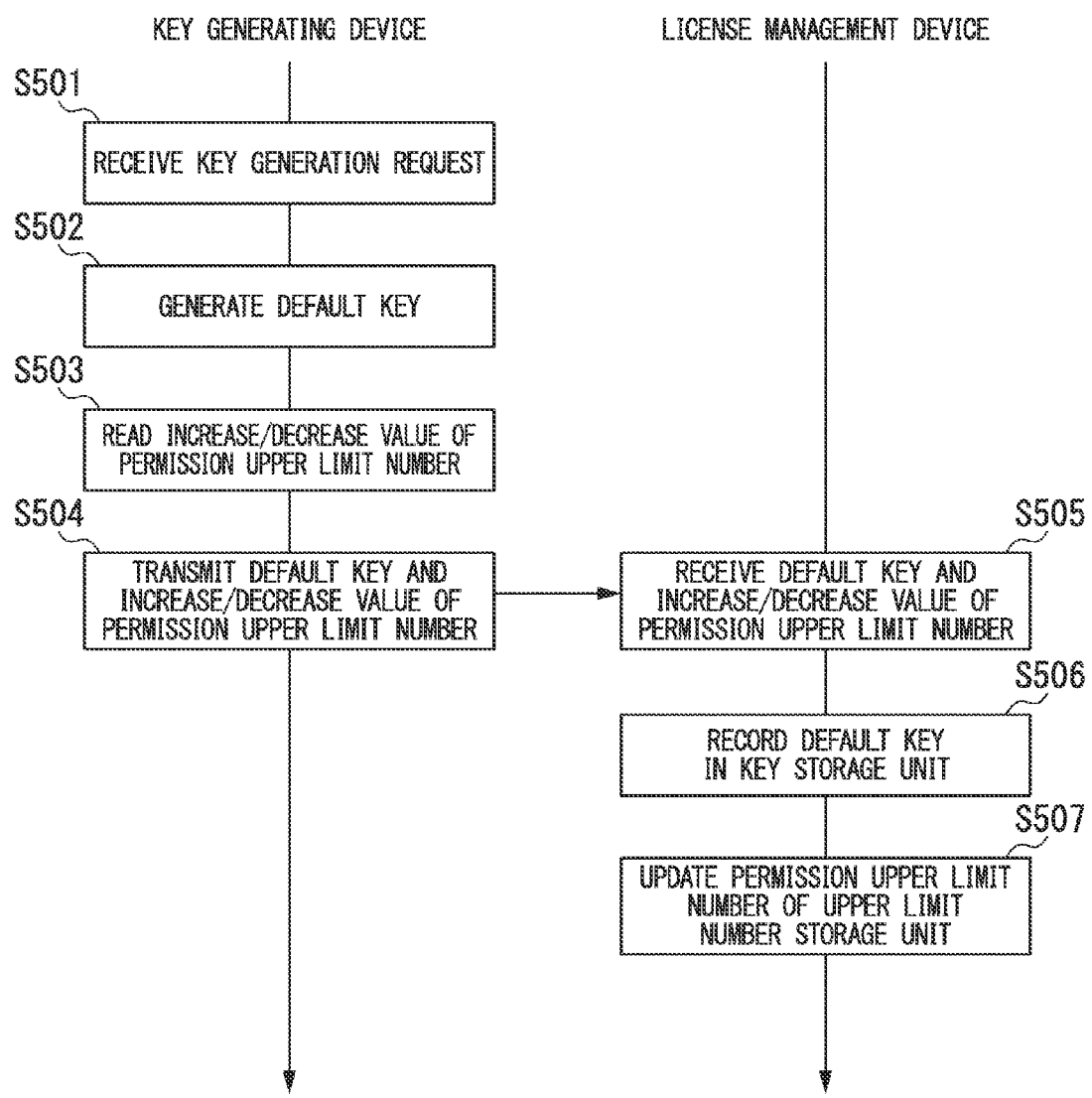
FIG. 6 is a sequence diagram illustrating a process of storing a default key in a license management device and updating a permission upper limit number.

FIG. 6 is a sequence diagram illustrating a process of recording the default key and updating the permission upper limit number in the license management device 30.

When the licensee starts license management through the license management device 30 or when the licensee has newly purchased the wireless device 10, the licensee requests the key generating device 40 of the licenser to generate the default key of the new wireless device 10 via the network. The key generation request includes the identification information of the wireless device 10 to which the generated default key is applied.

When the communication unit 406 of the key generating device 40 receives the key generation request (step S501), the default key generating unit 402 generates the default key specific to the wireless device 10 using the encryption key associated with the identification information of the wireless device 10 represented by the key generation request (step S502).

Then, the upper limit number increase/decrease value reading unit 405 reads the increase/decrease value of the permission upper limit number stored in the upper limit number increase/decrease value storage unit 404, and rewrites the increase/decrease value of the permission upper limit number stored in the upper limit number increase/decrease value storage unit 404 to 0 (step S503). Then, the communication unit 406 encrypts the default key generated in step S502 and the increase/decrease value of the permission upper limit number read in step S503 using the encryption key specific to the license management device 30, and transmits the default key and the increase/decrease value of the permission upper limit number to the license management device 30 via the network (step S504). At this time, the communication unit 406 transmits the default key in association with the identification information of the wireless device 10 to which the default key is applied.

When the key generating device 40 transmits the default key and the increase/decrease value of the permission upper limit number, the communication unit 301 receives the default key and the increase/decrease value of the permission upper limit number (step S505). Then, the key recording unit 302 records the default key received by the communication unit 301 in the key storage unit 303 in association with the identification information of the wireless device 10 (step S506).

Further, the upper limit number managing unit 304 adds the increase/decrease value of the permission upper limit number received by the communication unit 301 to the permission upper limit number stored in the upper limit number storage unit 305 (step S507).

Through the above process, the default key generated by the key generating device 40 is recorded in the license management device 30, and the increase/decrease value of the permission upper limit number generated by the key generating device 40 is applied to the license management device 30.

Next, an operation of updating a function permitted in the wireless device 10 by the license management device 30 will be described.

Figure 7:
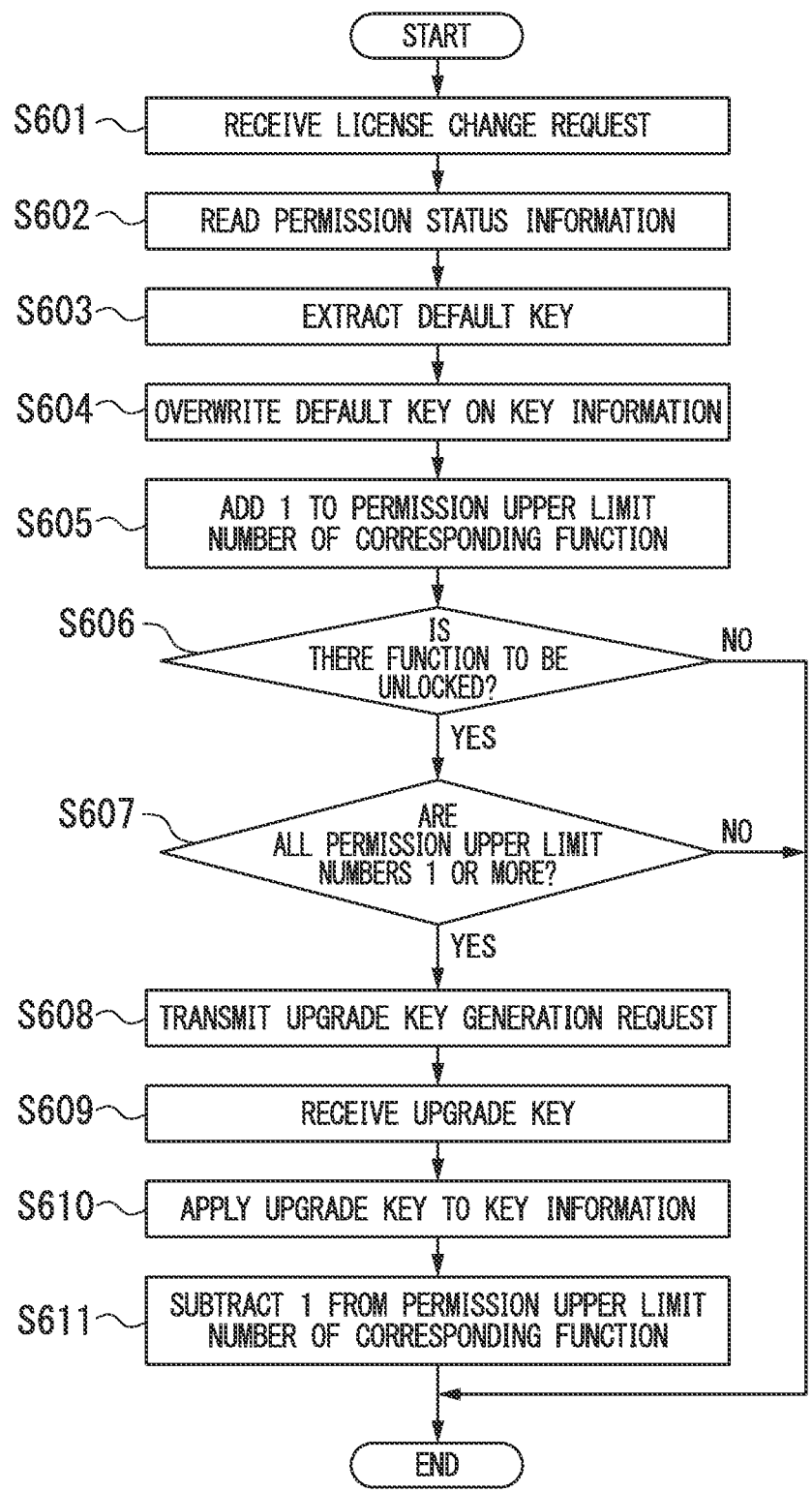
FIG. 7 is a flowchart illustrating an operation of changing a function to be permitted in a wireless device by a license management device.

FIG. 7 is a flowchart illustrating an operation of updating a function permitted in the wireless device 10 by the license management device 30.

When the licensee of the wireless device 10 inputs the license change request used to request the license management device 30 to unlock or restrict a function of the wireless device 10, the key extracting unit 306 receives the license change request (step S601). The license change request includes the identification information of the wireless device 10 of the target and a corresponding function when the function is unlocked. Then, the permission status reading unit 307 reads the permission status information representing the function permitted in the wireless device 10 from the wireless device 10 represented by the identification information included in the license change request (step S602).

Then, the key extracting unit 306 extracts the default key associated with the identification information included in the license change request from the key storage unit 303 (step S603). Then, the key applying unit 308 records the default key extracted by the key extracting unit 306 in the wireless device 10 represented by the identification information included in the license change request, that is, in the wireless device 10 of the target as the key information (step S604). Then, the upper limit number managing unit 304 adds 1 to the permission upper limit number associated with the permitted function represented by the permission status information read by the permission status reading unit 307 among the permission upper limit numbers stored in the upper limit number storage unit 305 (step S605). Through this operation, it is possible to apply the default key to the wireless device 10, restrict all functions permitted in the wireless device 10, and increase the permission upper limit numbers of the restricted functions.

Then, the key extracting unit 306 determines whether the license change request includes information representing a function to be unlocked (step S606). When the key extracting unit 306 determines that the license change request includes information representing a function to be unlocked (YES in step S606), the upper limit number managing unit 304 determines whether all of the permission upper limit numbers associated with the functions to be unlocked that are represented by the license change request are 1 or more (step S607). When all of the permission upper limit numbers stored in the upper limit number storage unit 305 are determined to be 1 or more (YES in step S607), the key extracting unit 306 transmits the upgrade key generation request used to request generation of the upgrade key associated with the function to be unlocked or a combination of functions that is represented by the license change request to the key generating device 40 from the key storage unit 303 via the network (step S608).

When the communication unit 406 of the key generating device 40 receives the upgrade key generation request from the license management device 30, the upgrade key generating unit 403 reads the encryption key associated with the identification information of the wireless device 10 represented by the generation request from the wireless device information storage unit 401. Then, the upgrade key generating unit 403 generates the key information used to unlock the function based on the function or the combination of the functions represented by the generation request. Then, the upgrade key generating unit 403 generates the upgrade key by generating difference data between the generated key information and the default key and encrypting the read encryption key. The communication unit 406 transmits the upgrade key generated by the upgrade key generating unit 403 to the license management device 30.

When the communication unit 301 of the license management device 30 receives the upgrade key from the key generating device 40 (step S609), the key applying unit 308 applies the received upgrade key to the key information of the wireless device 10 represented by the identification information included in the license change request (step S610).

Then, the upper limit number managing unit 304 subtracts 1 from the permission upper limit number associated with the function to be unlocked that is represented by the license change request among the permission upper limit numbers stored in the upper limit number storage unit 305 (step S611), and then the process ends. Through this operation, it is possible to apply the upgrade key to the wireless device 10, unlock the function of the wireless device 10, and reduce the permission upper limit number of the unlocked function.

Meanwhile, when the license change request is determined to include no information representing a function to be unlocked in step S606 (NO in step S606) or when it is determined in step S607 that there is a function in which the upper limit numbers stored in the upper limit number storage unit 305 are zero (0) (NO in step S607), the process of applying the upgrade key is not performed, and the process ends. Further, when it is determined in step S607 that there is a function in which the upper limit numbers stored in the upper limit number storage unit 305 are zero (0) (NO in step S607), it is desirable to output an error message such as "the number of licenses of the selected function is insufficient" before the process ends.

Next, a permission upper limit number management operation in the license management device 30 will be described.

When the licensee has purchased a new management device from the licenser and a predetermined function in the management device has been unlocked in advance, the upper limit number stored in the upper limit number storage unit 305 of the license management device 30 needs to be updated according to the unlocked function. Thus, in the present embodiment, the permission status information that is information of a function permitted in the wireless device 10 using the monitoring control device 20 is collected, and the permission upper limit number is updated based on the permission status information at regular intervals.

Specifically, the monitoring control device 20 acquires the permission status information from the plurality of wireless devices 10 connected via the communication path at regular intervals, and notifies the license management device 30 of the permission status information. Further, when the wireless devices 10 connected to the monitoring control device 20 are connected in series as illustrated in FIG. 1, the permission status information is acquired from all the wireless devices 10 that are connected in series. In other words, the wireless device 10 (the wireless device 10 of the subsequent stage) connected to the monitoring control device 20 via another wireless device 10 (the wireless device 10 of the preceding stage) transmits its permission status information to the wireless device 10 of the preceding stage, and the wireless device 10 of the preceding stage transmits its permission status information to the monitoring control device 20 together with the permission status information received from the wireless device 10 of the subsequent stage.

Then, when the monitoring information acquiring unit 309 of the license management device 30 acquires the permission status information from all the monitoring control devices 20, the upper limit number managing unit 304 calculates a permission number in the wireless device 10 for each function based on all pieces of acquired permission status information. Then, the current permission upper limit number can be calculated by subtracting the calculated permission number from a permission number determined according to the contract. Then, the upper limit number managing unit 304 overwrites the calculated permission upper limit number in the upper limit number storage unit 305.

Through this operation, when the number of the wireless devices 10 of the management target increases, the license management device 30 can update the permission upper limit number stored in the upper limit number storage unit 305. Further, as the license management device 30 acquires the permission status information from the plurality of wireless devices 10 through the monitoring control device 20, it is possible to avoid congestion in the communication path between the wireless device 10 and the license management device 30 in the process of updating the permission upper limit number.

As described above, according to the present embodiment, the license management device 30 can overwrite the key information with the default key specific to the wireless device 10 and cause the wireless device 10 to enter the state (default state) in which all functions are restricted. Further, the license management device 30 can release a restriction of a function in the wireless device 10 by applying the upgrade key to the key information overwritten with the default key. In other words, when the licensee desires to change a function unlocking target from a certain wireless device 10 to another wireless device 10, the licensee can change the wireless device 10 in which a restriction of a function is to be unlocked by inputting the license change request used to request unlocking of the function in the certain wireless device 10 to the license management device 30 and inputting the license change request used to request unlocking of the function in another wireless device 10 to the license management device 30.

Further, according to the present embodiment, the license management device 30 updates the permission upper limit number stored in the upper limit number storage unit 305 when the key applying unit 308 applies the default key or the upgrade key to the wireless device 10. Further, the key applying unit 308 does not apply the upgrade key to the wireless device 10 when the permission upper limit number is 0. Through this operation, the license management device 30 can restrict or unlock a function of the wireless device 10 within the range of the permission number decided according to the contract between the licenser and the licensee.

Further, according to the present embodiment, the license management device 30 is connected with the key generating device 40 via the network. Thus, the license management device 30 can issue the key generation request to the key generating device 40 on demand according to the licensee's request. Thus, the license management device 30 can acquire the upgrade key requested by the licensee without delay even when the upgrade key is not stored in advance.

Further, when the upgrade keys of all patterns are stored in advance and a new license form is added, the license management device 30 needs to update a table in which the upgrade keys are stored. However, according to the present embodiment, even when a new license form is added, the key generating device 40 can flexibly cope with a change in a license form since the upgrade key is generated on demand.

The exemplary embodiment of the invention has been described in detail with reference to the accompanying drawings, but the concrete structure is not limited to the above example, and various design changes or the like can be made within the scope not departing from the gist of the invention.

For example, the present embodiment has been described in connection with the example in which, each time the license change request is received, the permission status reading unit 307 reads the permission status information from the wireless device 10, and updates the permission upper limit number based on the permission status information, but the invention is not limited to this example. For example, the permission status information acquired from the monitoring control device 20 by the monitoring information acquiring unit 309 may be stored, and the permission upper limit number may be updated based on the permission status information.

Further, the present embodiment has been described in connection with the example in which the upper limit number storage unit 305 stores the permission upper limit number for each function, but the invention is not limited to this example. For example, the upper limit number storage unit 305 may store the permission upper limit number for each upgrade key. For example, the permission upper limit number may be stored for each upgrade key such that the permission upper limit number of the upgrade key of the capacity application is 5, the permission upper limit number of the upgrade key of the redundancy application is 5, and the permission upper limit number of the upgrade key of the capacity/redundancy application is 1. In this case, the capacity and the redundancy are applied to one wireless device 10.

Further, the present embodiment has been described in connection with the example in which the license management device 30 receives and stores the default key from the key generating device 40 in advance, but the invention is not limited to this example. For example, the key generating device 40 may generate the default key as well as the upgrade key each time there is a change request The wireless device 10, the monitoring control device 20, the license management device 30, and the key generating device 40 have an internal computer system. An operation of each processing unit is stored in a computer readable recording medium in a program form, and the above-described process is performed as the program is read and executed by a computer. Here, examples of the computer readable recording medium include a magnetic disk, a magneto optical disc, a CD-ROM, a DVD-ROM, and a semiconductor memory. Further, the computer program may be delivered to the computer via a communication line, and the computer may execute the delivered program.

Further, the program may be configured to implement a part of the above-described function.

In addition, the program may be a so-called differential file (a differential program) that can implement the above-described function by a combination with a program already recorded in the computer system.

Priority is claimed on Japanese Patent Application No. 2011-157658, filed Jul. 19, 2011, the content of which is incorporated herein by reference.

INDUSTRIAL APPLICABILITY

According to the license management device of the present invention, it is possible to change a wireless device of a function unlocking target.

DESCRIPTION OF REFERENCE SYMBOLS

10 Wireless device
10-1 Wireless device
10-N Wireless device
20 Monitoring control device
20-1 Monitoring control device
20-M Monitoring control device
30 License management device
40 Key generating device
301 Communication unit
302 Key recording unit
303 Key storage unit
304 Upper limit number managing unit
305 Upper limit number storage unit
306 Key extracting unit
307 Permission status reading unit
308 Key applying unit
309 Monitoring information acquiring unit
401 Wireless device information storage unit
402 Default key generating unit
403 Upgrade key generating unit
404 Upper limit number increase/decrease value storage unit
405 Upper limit number increase/decrease value reading unit
406 Communication unit

The invention claimed is:

1. A license management device configured to manage permission of execution of a predetermined function in a licensee device configured to perform a function according to key information specifying an operation, comprising:
a request receiving unit configured to receive a license change request used to request the licensee device to unlock or restrict a function;
a default applying unit configured to overwrite a default key restricting a function of the licensee device that is key information specific to the licensee device represented by the license change request on key information of the licensee device when the request receiving unit receives the license change request, wherein the function of the licensee device is restricted to a default state;
an upgrade key requesting unit configured to transmit an upgrade key generation request including identification information of the licensee device and a function to be unlocked that are represented by the license change request received by the request receiving unit to a key generating device that generates an upgrade key that is difference data between the key information unlocking the function restricted by the default key of the licensee device and the default key based on the identification information of the licensee device, and a function applied to the licensee device;
an upgrade key acquiring unit configured to acquire the upgrade key generated based on the upgrade key generation request transmitted by the upgrade key requesting unit from the key generating device; and an upgrade applying unit configured to apply the upgrade key acquired by the upgrade key acquiring unit to the key information of the licensee device after the default applying unit overwrites the key information.

2. The license management device according to claim 1, further comprising:
an upper limit number storage unit configured to store a permission upper limit number representing a number of times execution of a predetermined function is permissible in the licensee device; and
a reflecting unit configured to update the permission upper limit number stored in the upper limit number storage unit based on information of a difference between a function unlocked in the licensee device before the key information is rewritten and a function unlocked in the licensee device after the key information is rewritten when the default applying unit or the upgrade applying unit rewrites the key information,
wherein, when the request receiving unit receives the license change request and the permission upper limit number stored in the upper limit number storage unit is 1 or more, the upgrade applying unit applies an upgrade key that is associated with the licensee device represented by the request and corresponds to a changed function represented by the license change request to the key information of the licensee device.

3. The license management device according to claim 2, wherein the upper limit number storage unit stores the permission upper limit number for each function to be unlocked,
the storage unit stores the upgrade keys corresponding to all functions and a combination of the functions for each licensee device, and
when the default applying unit or the upgrade applying unit rewrites the key information, the reflecting unit updates the permission upper limit number associated with each function stored in the upper limit number storage unit based on information of a difference between a function unlocked in the licensee device before the key information is rewritten and a function unlocked in the licensee device after the key information is rewritten.

4. The license management device according to claim 3, further comprising,
a permission status reading unit configured to read permission status information that is information of a function permitted in the licensee device from a plurality of licensee devices,
wherein, when the default applying unit rewrites the key information, the reflecting unit specifies a function permitted in the licensee device before the key information is rewritten based on the permission status information read by the permission status reading unit, and upgrade the permission upper limit number stored in the upper limit number storage unit based on information of a difference between the specified function and a function permitted in the licensee device after the key information is rewritten.

5. The license management device according to claim 2, further comprising,
a permission status reading unit configured to read permission status information that is information of a function permitted in the licensee device from a plurality of licensee devices,
wherein, when the default applying unit rewrites the key information, the reflecting unit specifies a function permitted in the licensee device before the key information is rewritten based on the permission status information read by the permission status reading unit, and upgrades the permission upper limit number stored in the upper limit number storage unit based on information of a difference between the specified function and a function permitted in the licensee device after the key information is rewritten.

6. The license management device according to claim 5, further comprising:
a monitoring information acquiring unit configured to read the permission status information from a plurality of licensee monitoring devices that acquire the permission status information from the different licensee devices; and
an upper limit number updating unit configured to update the upper limit number stored in the upper limit number storage unit based on the permission status information acquired by the monitoring information acquiring unit.

7. The license management device of claim 6, wherein the license management device updates the permission upper limit number based on the permission status information at regular intervals.

8. The license management device of claim 7, wherein the plurality of licensee monitoring devices:
acquires the permission status information from the plurality of licensee devices connected via the communication path at regular intervals; and
notifies the license management device of the acquired permission status information.

9. The license management device of claim 8, wherein the plurality of licensee devices are connected to the plurality of licensee monitoring devices in series.

10. The license management device of claim 9, wherein a first licensee device in a subsequent stage which is connected to a licensee monitoring device of the plurality of licensee monitoring devices via a second licensee device in a preceding stage, transmits its permission status information to the second licensee device, and the second licensee device transmits its permission status information to the licensee monitoring device together with the permission status information of the first licensee device.

11. The license management device of claim 10, wherein when the monitoring information acquiring unit acquires the permission status information from the plurality of licensee monitoring devices, the upper limit number updating unit:
calculates a permission number in the licensee device for each function based on all pieces of acquired permission status information;
calculates the permission upper limit number by subtracting the calculated permission number from a predetermined permission number; and
overwrites the calculated permission upper limit number in the upper limit number storage unit.

12. A license management system including a plurality of licensee devices performing a function according to key information specifying an operation, a license management device configured to manage a grant of a license for a predetermined function to a licensee device of the plurality of licensee devices, and a key generating device configured to generate difference data of the key information in the licensee device, comprising:
the licensee device including:
a key information storage unit configured to store the key information, and a function performing unit configured to perform the function according to a restriction represented by the key information stored in the key information storage unit;

the license management device including:
a request receiving unit configured to receive a license change request used to request the licensee device to unlock or restrict a function,
a default applying unit configured to overwrite a default key restricting a function of the licensee device that is key information specific to the licensee device represented by the request on key information of the licensee device when the request receiving unit receives the license change request, wherein the function of the licensee device is restricted to a default state,
an upgrade key requesting unit configured to transmit an upgrade key generation request including identification information of the licensee device and a function to be unlocked that are represented by the license change request received by the request receiving unit to the key generating device,
an upgrade key acquiring unit configured to acquire the upgrade key generated based on the upgrade key generation request transmitted by the upgrade key requesting unit from the key generating device, and
an upgrade applying unit configured to apply the upgrade key acquired by the upgrade key acquiring unit to the key information of the licensee device after the default applying unit overwrites the key information; and the key generating device including:
an upgrade key generating unit configured to receive the upgrade key generation request from the license management device, and generate an upgrade key that is difference data between the key information in the licensee device and the default key based on the identification information of the licensee device and a function applied to the licensee device that are represented by the upgrade key generation request, and
a key transmitting unit configured to transmit the upgrade key generated by the upgrade key generating unit to the license management device.

13. A license management method using a license management device configured to manage a grant of a license for a predetermined function to a licensee device that performs a function according to key information specifying an operation, the method comprising:
receiving, by a request receiving unit, a license change request used to request the licensee device to unlock or restrict a function;
overwriting, by a default applying unit, a default key restricting a function of the licensee device that is key information specific to the licensee device represented by the request on key information of the licensee device when the request receiving unit receives the license change request, wherein the function of the licensee device is restricted to a default state;
transmitting, by an upgrade key requesting unit, an upgrade key generation request including identification information of the licensee device and a function to be unlocked that are represented by the license change request received by the request receiving unit to a key generating device that generates an upgrade key that is difference data between the key information unlocking the function restricted by the default key of the licensee device and the default key based on the identification information of the licensee device and a function applied to the licensee device;
acquiring, by an upgrade key acquiring unit, the upgrade key generated based on the upgrade key generation request transmitted by the upgrade key requesting unit from the key generating device; and
applying, by an upgrade applying unit, the upgrade key acquired by the upgrade key acquiring unit to the key information of the licensee device after the default applying unit overwrites the key information.

14. A non-transitory computer-readable medium storing a program causing a license management device configured to manage a grant of a license for a predetermined function to a licensee device configured to perform a function according to key information specifying an operation to function as:
a request receiving unit configured to receive a license change request used to request the licensee device to unlock or restrict a function;
a default applying unit configured to overwrite a default key restricting a function of the licensee device that is key information specific to the licensee device represented by the request on key information of the licensee device when the request receiving unit receives the license change request, wherein the function of the licensee device is restricted to a default state;
an upgrade key requesting unit configured to transmit an upgrade key generation request including identification information of the licensee device and a function to be unlocked that are represented by the license change request received by the request receiving unit to a key generating device that generates an upgrade key that is difference data between the key information unlocking the function restricted by the default key of the licensee device and the default key based on the identification information of the licensee device and a function applied to the licensee device;
an upgrade key acquiring unit configured to acquire the upgrade key generated based on the upgrade key generation request transmitted by the upgrade key requesting unit from the key generating device; and
an upgrade applying unit configured to apply the upgrade key acquired by the upgrade key acquiring unit to the key information of the licensee device after the default applying unit overwrites the key information.

* * * * *